Jan. 26, 1971  J. C. ABROMAVAGE ET AL  3,558,158
COMPRESSION HITCH BAR ASSEMBLY
Filed June 23, 1969  3 Sheets-Sheet 1

INVENTORS
JOHN C. ABROMAVAGE
JAMES W. RYDEN
BY David H. Semmes
ATTORNEY

INVENTORS
JOHN C. ABROMAVAGE
JAMES W. RYDEN
BY David H. Semmes
ATTORNEY

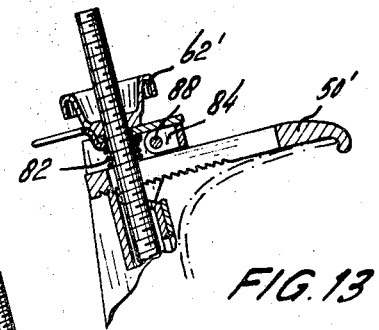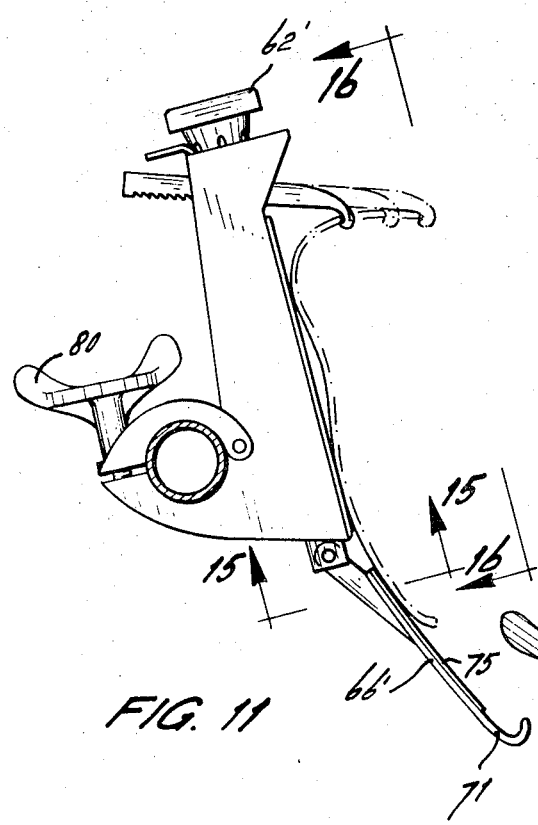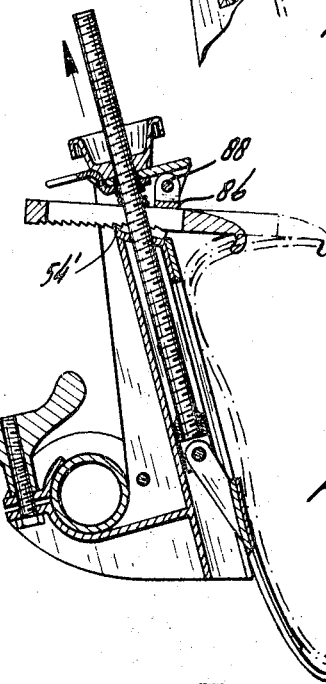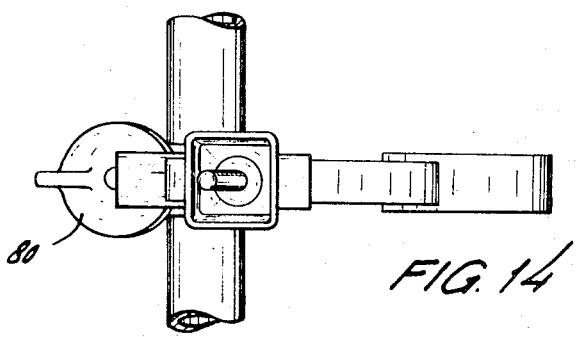

United States Patent Office 3,558,158
Patented Jan. 26, 1971

3,558,158
COMPRESSION HITCH BAR ASSEMBLY
John C. Abromavage, Tempe, and James W. Ryden, Phoenix, Ariz., assignors to Arcoa, Inc., Phoenix, Ariz., a corporation of Oregon
Filed June 23, 1969, Ser. No. 835,487
Int. Cl. B60d 1/14
U.S. Cl. 280—502                                10 Claims

ABSTRACT OF THE DISCLOSURE

A hitch bar assembly of the type supporting a ball socket for towing a trailer and including compression clamps encircling the hitch bar and engageable with the towing vehicle rear bumper.

BACKGROUND OF THE INVENTION

(1) Field of the Invention

In the trailer rental industry there has developed a need for a towing vehicle hitch bar which is attachable to any type of towing vehicle bumper. The hitch bar is required to be universally attachable, since the businessman who uses trailers, cannot fully anticipate all types of bumpers in use on the road today. The average customer who rents trailers does not have a ball socket or other towing attachment. Hence, the hitch bar has been devised for quick and secure attachment of the hitch bar and ball socket to a variety of automobile bumpers.

(2) Description of the Prior Art

In the prior art, hitch bars have utilized compression clamps, chains and like compression assemblies for attaching the hitch bar to an automobile towing vehicle bumper. A principal shortcoming of such hitch bars has been the misalignment of the ball socket with respect to both the towing vehicle bumper and the axis of the hitch bar. As a result, the ball socket is positioned above the hitch bar and because it is subject to maximum stress from the towed trailer, a certain amount of torque develops resulting in twisting of the ball socket and tow bar with consequent wrenching of the clamps from the bumper. Also, the individual compression assemblies have been incapable of quick and secure attachment to a variety of bumpers, so as to maintain compression during all modes of towing stress.

SUMMARY OF THE INVENTION

According to the present invention, a hitch bar is uniquely configured so that the supported ball socket is aligned with the axis of the hitch bar, both vertically and horizontally, and the compression clamps are quickly and securely attached to any type of auto bumper.

The hitch bar is depressed in its mid-portion, so that the ball socket axis is aligned with the hitch bar axis and the clamping elements at either side include both horizontal and vertical compression elements for securing a top clamp and a bottom clamp to the bumper.

BRIEF DESCRIPTION OF THE DRAWINGS

FIG. 11 is a side elevation of a modification of invention wherein the bottom clamp is elongated to accommodate a variety of contemporary automobile bumpers;

FIG. 12 is a vertical section of the FIG. 1 modification in locked position, showing the bottom clamp forshortened to accommodate a smaller bumper;

FIG. 13 is a fragmentary section of the FIG. 11 modification with the housing top clamp bearing lug pivoted to accommodate yet another type of bumper;

FIG. 14 is a top plan thereof;

FIG. 15 is a bottom plan, taken along line 15—15 of FIG. 11; and

FIG. 16 is a side elevation, taken along line 16—16 of FIG. 11.

DESCRIPTION OF THE PREFERRED EMBODIMENTS

According to the present invention, the compression clamps may be installed on the bumper before installing the hitch bar assembly. The hitch bar is then set in place and there is eliminated the problem of aligning the ball vertically or horizontally. Immediately as the compression clamps are fastened around the hitch bar, the ball socket is supported in the correct position.

Figure 1:
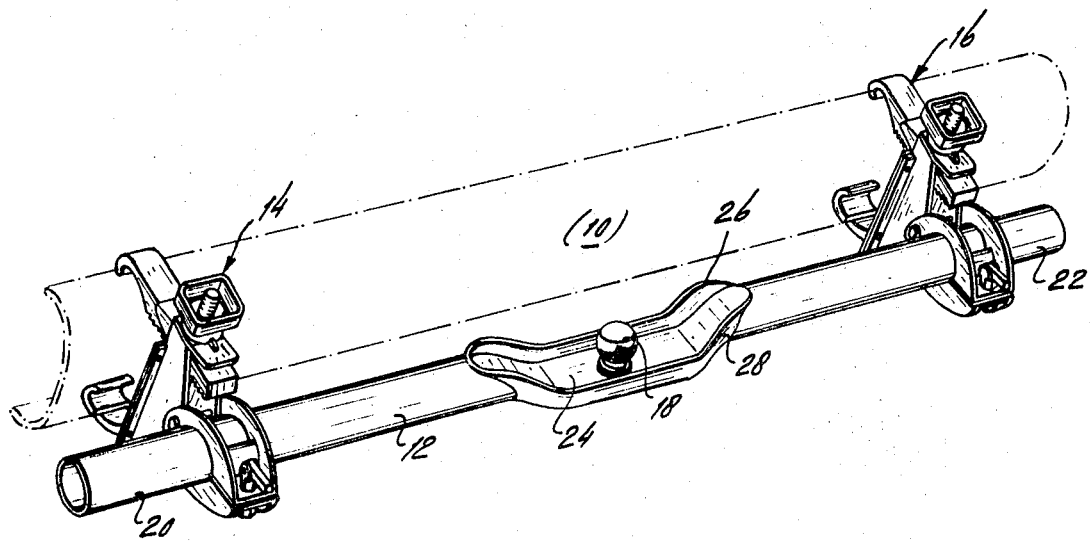
FIG. 1 is a perspective view of the proposed compression hitch bar assembly, showing the automobile bumper in phantom.
Figure 3:
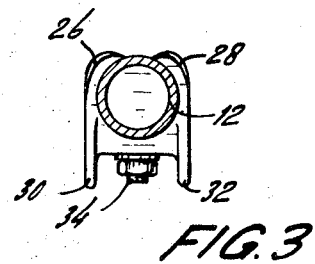
FIG. 3 is a transverse section, taken along section line 3—3 of FIG. 2.

In FIG. 1 automobile bumper 10 is illustrated in phantom with hitch bar 12 having bumper-engaging compression clamps 14 and 16 mounted at the hitch bar ends 20 and 22. The hitch bar 12 includes a depressed mid-portion 24 which may have vertically extending top flanges 26 and 28 on its top and vertically extending bottom flanges 30 and 32.

Figure 2:
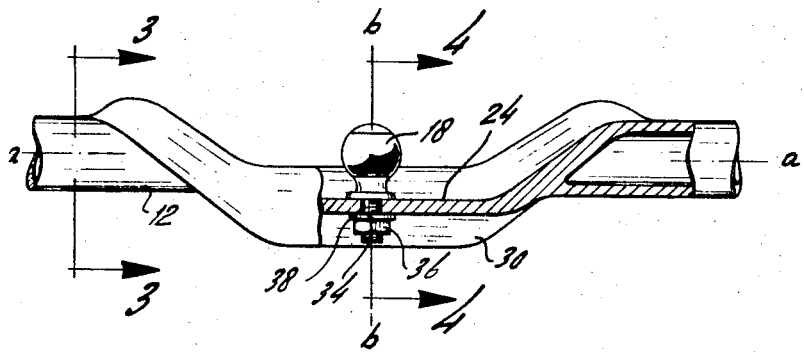
FIG. 2 is a fragmentary, enlarged front elevation of the depressed mid-portion of the hitch bar.
Figure 4:
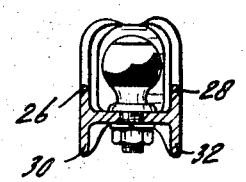
FIG. 4 is a transverse section of the ball socket and hitch bar, taken along section line 4—4 of FIG. 2.

As illustrated in FIG. 2, the depressed platform 24 supports a ball socket 18 which has a threaded shank 34 extending through the platform and is secured thereto by means of washer 38 and lock nut 36. The ball socket is thus set in alignment with the horizontal axis A—A of the hitch bar and the vertical axis B—B.

The compression housing 40 are illustrated in FIGS. 5–10 as principally including a concave compression seat 42 and associated compression pivoted arm 76, pivoted in the housing as at 46 so that compression element 48 and pivoted bolt lock 50 may secure the hitch bar 12 therein. As illustrated in FIG. 11, a wing nut 80 may be employed in place of pivoted lock bolt 50.

The compression housing includes a top bearing shoulder 59, a top compression passage 44 extending horizontally through the housing and a bottom compression passage 74, extending from the top to the bottom of the housing. Top bumper clamp 50 includes serrations or teeth 52 and arcuate tip 51. Clamp 50 extends through horizontal passage 44 so that teeth 52 engage the lock surface 54 on the housing front. Teeth 52 may be set on lock surface 54 as the clamp is placed on the bumper. The bottom bumper engaging clamp 66 is pivoted at 68 to a threaded bolt 64 extending through passageway 74, so that the arm 66 extends through slot 56 defined in the housing inner face. Bolt 64 may include guide seat 72 and optional bushing element 73 at its bottom. Webbing 58 or like resilient material may be positioned on either side of slot 56. When securing the clamp, the bottom arm 66 is extended so that its optional inclined tip 70 engages the bottom edge of the bumper. Threaded knob 62 is turned to develop an upward thrust on bolt 64, thus compressing lock washer 60 and the entire assembly. Top clamp 50 bears against surface 59, increasingly as upward thrust is developed.

Figure 10:
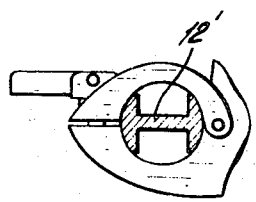
FIG. 10 is a transverse section of the compression assembly, showing a modified hitch bar having an I-shaped cross-section.
Figure 5:
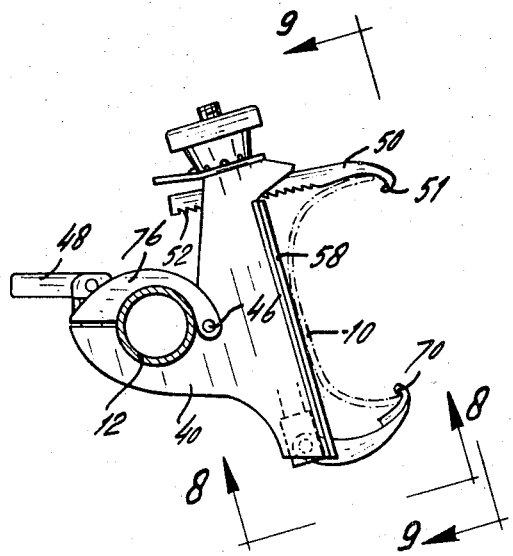
FIG. 5 is a side elevation of the compression housing, showing the hitch bar in section and the automobile bumper in phantom.
Figure 6:
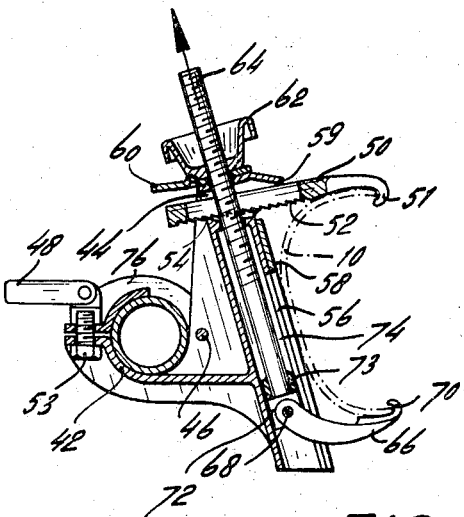
FIG. 6 is a vertical section of the compression housing, showing the automobile bumper in phantom.
Figure 7:
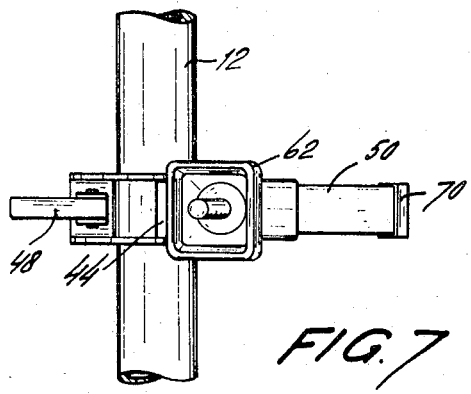
FIG. 7 is a top plan of the housing, showing the hitch bar fragmentarily.
Figure 8:
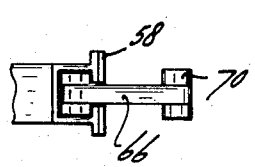
FIG. 8 is a fragmentary bottom plan taken along line 8—8 of FIG. 5, showing the housing fragmentarily.
Figure 9:
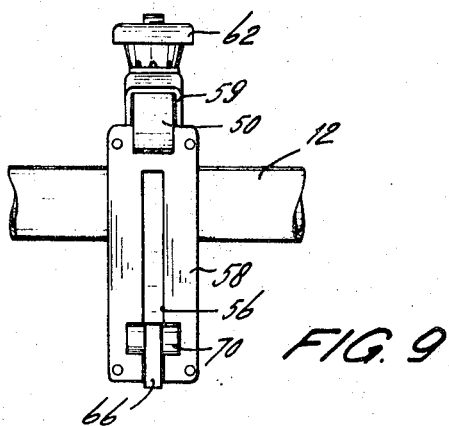
FIG. 9 is a front elevation taken along line 9—9 of FIG. 5, showing the slot on the inner face of the bottom compression passage and the hitch bar in fragment.

In FIG. 10, there is illustrated the modified tow bar 12' which is substantially I-shaped in cross-section, is lighter and equally as strong as the tubular bar illustrated in the preceeding figures.

In FIGS. 11–16 the modified hitch is illustrated wherein the lower compression clamp 66' has an elongated sector 71 and a webbing face or like resilient material 75. As will be apparent, by turning knob 62' the lower elongated clamp may be moved from a variety of positions to accommodate bumpers of various dimensions. A wing nut 80 may be employed to compress the hitch bar seat elements. Also, the top lock nut 62' may include a compression spring 82. A bearing lug 84 pivoted upon pin 88 and including resilient surface 86, may be supported in top of the housing to abut the top of clamp 50' in its variety of bumper clamping modes.

We claim:
1. A vehicle compression hitch bar assembly of the type attachable to an automobile vehicle bumper comprising:
 (A) a horizontal hitch bar, having a ball socket supported at its mid-section; and
 (B) compression assemblies encircling said hitch bar at each end and attachable to an automobile bumper, each assembly including:
  (i) a housing defining hitch bar seat and having a bottom compression passage with a slotted inner face extending from the top to the bottom of the housing and a top compression passage extending through the top of the housing;
  (ii) a bumper top clamp extending through said top compression passage and including a bumper clasping element at one end and housing engaging notches at its other end;
  (iii) a vertical compression bolt extending through said bottom compression passage, so that a threaded portion and locking nut are exposed above said housing; and
  (iv) a bumper bottom engaging clamp pivoted to the bottom of said compression bolt within said bottom compression passage and extending through said slot to engage a bumper bottom.

2. A vehicle compression hitch bar assembly of the type attachable to an automobile vehicle bumper comprising:
 (A) a horizontal hitch bar having its mid-portion depressed with respect to the hitch bar axis, so as to aligned with the axis of said hitch bar; and
 (B) compression assemblies encircling said hitch bar at each end and attachable to an automobile bumper, each assembly including:
 support a ball socket vertically and horizontally
  (i) a housing defining hitch bar seat and having a bottom compression passage with a slotted inner face extending from the top to the bottom of the housing and a top compression passage extending through the top of the housing;
  (ii) a bumper top clamp extending through said top compression passage and including a bumper clasping element at one end and housing engaging notches at its other end;
  (iii) a vertical compression bolt extending through said bottom compression passage, so that a threaded portion and locking nut are exposed above said housing; and
  (iv) a bumper bottom engaging clamp pivoted to the bottom of said compression bolt within said bottom compression passage and extending through said slot to engage a bumper bottom.

3. A vehicle compression hitch bar assembly as in claim 2, said ball socket including a threaded shaft extending through said depressed portion and secured thereto by nut means.

4. A vehicle compression hitch bar assembly of the type attached to an automobile bumper as in claim 3, said mid-portion of said hitch bar having vertically extending top and bottom flanges on either side of said ball socket.

5. A vehicle compression hitch bar assembly as in claim 4, said hitch bar seat in said housing including:
 (i) a concave stationary bottom seat; and
 (ii) a concave top seat, pivoted in said housing, so as to lock said to seat and said bottom seat about said hitch bar.

6. A vehicle compression hitch bar assembly as in claim 5, said housing including a housing inner bearing shoulder extending downwardly from the top of said housing and abutting the top of said top bumper engaging clamp.

7. A vehicle compression hitch bar assembly as in claim 6, including lock washer means encircling said threaded portion of said compression bolt beneath said locking nut.

8. A vehicle compression hitch bar assembly as in claim 7, said vertical compression bolt including guide means abutting the inner walls of said bottom compression passage.

9. A vehicle compression hitch bar assembly as in claim 8, including resilient means secured to the inner face of said housing on either side of said slot.

10. A vehicle compression hitch bar assembly as in claim 9, said lower bumper engaging arm including a widened bumper engaging tab at its outer end.

References Cited

UNITED STATES PATENTS

| | | | |
|---|---|---|---|
| 2,525,505 | 10/1950 | Wiedman | 280—502 |
| 2,726,880 | 12/1955 | Klein | 280—502 |
| 2,747,893 | 5/1956 | Strand | 280—502 |
| 3,113,789 | 12/1963 | Safford | 280—502 |

LEO FRIAGLIA, Primary Examiner

R. R. SONG, Assistant Examiner